US007936339B2

(12) United States Patent
Marggraff et al.

(10) Patent No.: US 7,936,339 B2
(45) Date of Patent: May 3, 2011

(54) METHOD AND SYSTEM FOR INVOKING COMPUTER FUNCTIONALITY BY INTERACTION WITH DYNAMICALLY GENERATED INTERFACE REGIONS OF A WRITING SURFACE

(75) Inventors: James Marggraff, Lafayette, CA (US); Tracy L. Edgecomb, Berkeley, CA (US); Teresa Cameron, Huntington Beach, CA (US); Nicole Wrubel, Berkeley, CA (US); Steve Baldzikowski, Emeryville, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 1098 days.

(21) Appl. No.: 11/265,001

(22) Filed: Nov. 1, 2005

(65) Prior Publication Data
US 2007/0097100 A1    May 3, 2007

(51) Int. Cl.
  *G06F 3/041*    (2006.01)
  *G06K 9/48*    (2006.01)
(52) U.S. Cl. ......... 345/173; 345/156; 345/181; 382/199
(58) Field of Classification Search .......... 345/173–181, 345/156–169
  See application file for complete search history.

(56) References Cited

U.S. PATENT DOCUMENTS

| | | |
|---|---|---|
| 2,182,334 A | 12/1939 | Crespo |
| 2,932,907 A | 4/1960 | Stieber et al. |
| 3,292,489 A | 12/1966 | Johnson et al. |
| 3,304,612 A | 2/1967 | Proctor et al. |
| 3,530,241 A | 9/1970 | Ellis |
| 3,591,718 A | 7/1971 | Asano |
| 3,657,812 A | 4/1972 | Lee |
| 3,782,734 A | 1/1974 | Krainin |
| 3,798,370 A | 3/1974 | Hurst |
| 3,888,311 A | 6/1975 | Cooke, Jr. |
| 3,911,215 A | 10/1975 | Hurst et al. |
| 3,921,165 A | 11/1975 | Dym |
| 4,079,194 A | 3/1978 | Kley |

(Continued)

FOREIGN PATENT DOCUMENTS

CN    1655184    8/2005

(Continued)

OTHER PUBLICATIONS

Kramer, "Translucent Patches-Dissolving Windows", Nov. 2, 1994 Symposium on User Interface Software and Technology. pp. 121-130, XP000197943.

(Continued)

*Primary Examiner* — Duc Q Dinh

(57) ABSTRACT

A device user interface in which computer functionality is invoked by user interaction with dynamically generated interface regions of a writing surface. A computer system identifies a marking written on the writing surface or a user selection of an existing written marking. Adjacent to the marking, the computer system automatically generates one or more interface regions associated with the marking. User interaction with one of these regions automatically invokes computer functionality related to the interacted region. A different function may be invoked by each region. The computer system dynamically positions and may dynamically size the interface regions based on the position (and size) of the marking. Multiple markings yield multiple regions, with different regions associated with respective markings. In one embodiment, the regions are established in front of and/or after a written word. Regions may also be established on top of and/or below the written word, for example. In another embodiment, the computer system is a pen-based interactive computer system.

38 Claims, 14 Drawing Sheets

U.S. PATENT DOCUMENTS

| | | |
|---|---|---|
| 4,220,815 A | 9/1980 | Gibson et al. |
| 4,318,096 A | 3/1982 | Thornburg et al. |
| 4,337,375 A | 6/1982 | Freeman |
| 4,375,058 A | 2/1983 | Bouma et al. |
| 4,425,099 A | 1/1984 | Naden |
| 4,464,118 A | 8/1984 | Scott et al. |
| 4,492,819 A | 1/1985 | Rodgers et al. |
| 4,570,149 A | 2/1986 | Thornburg et al. |
| 4,603,231 A | 7/1986 | Reiffel et al. |
| 4,604,058 A | 8/1986 | Fisher et al. |
| 4,604,065 A | 8/1986 | Frazer et al. |
| 4,627,819 A | 12/1986 | Burrows |
| 4,630,209 A | 12/1986 | Saito et al. |
| 4,650,926 A | 3/1987 | Nakamura et al. |
| 4,686,332 A | 8/1987 | Greanias et al. |
| 4,706,090 A | 11/1987 | Hashiguchi et al. |
| 4,739,299 A | 4/1988 | Eventoff et al. |
| 4,748,318 A | 5/1988 | Bearden et al. |
| 4,787,040 A | 11/1988 | Ames et al. |
| 4,793,810 A | 12/1988 | Beasley, Jr. |
| 4,839,634 A | 6/1989 | More et al. |
| 4,841,387 A | 6/1989 | Rindfuss |
| 4,853,494 A | 8/1989 | Suzuki |
| 4,853,498 A | 8/1989 | Meadows et al. |
| 4,853,499 A | 8/1989 | Watson |
| 4,880,968 A | 11/1989 | Kwang-Chien |
| 4,913,463 A | 4/1990 | Tlapek et al. |
| 4,922,061 A | 5/1990 | Meadows et al. |
| 4,924,387 A | 5/1990 | Jeppesen |
| 4,964,167 A | 10/1990 | Kunizawa et al. |
| 4,972,496 A | 11/1990 | Sklarew |
| 4,990,093 A | 2/1991 | Frazer et al. |
| 4,991,987 A | 2/1991 | Holloway et al. |
| 5,007,085 A | 4/1991 | Greanias et al. |
| 5,030,117 A | 7/1991 | Delorme |
| 5,053,585 A | 10/1991 | Yaniger |
| 5,057,024 A | 10/1991 | Sprott et al. |
| 5,059,126 A | 10/1991 | Kimball |
| 5,113,178 A | 5/1992 | Yasuda et al. |
| 5,117,071 A | 5/1992 | Greanias et al. |
| 5,128,525 A | 7/1992 | Stearns et al. |
| 5,149,919 A | 9/1992 | Greanias et al. |
| 5,157,384 A | 10/1992 | Greanias et al. |
| 5,168,147 A | 12/1992 | Bloomberg |
| 5,184,003 A | 2/1993 | McMillin et al. |
| 5,194,852 A | 3/1993 | More et al. |
| 5,209,665 A | 5/1993 | Billings et al. |
| 5,217,376 A | 6/1993 | Gosselin |
| 5,217,378 A | 6/1993 | Donovan |
| 5,220,136 A | 6/1993 | Kent |
| 5,220,649 A | 6/1993 | Forcier |
| 5,221,833 A | 6/1993 | Hecht |
| 5,250,930 A | 10/1993 | Yoshida et al. |
| 5,260,697 A | 11/1993 | Barrett et al. |
| 5,294,792 A | 3/1994 | Lewis et al. |
| 5,301,243 A | 4/1994 | Olschafskie et al. |
| 5,314,336 A | 5/1994 | Diamond et al. |
| 5,356,296 A | 10/1994 | Pierce et al. |
| 5,401,916 A | 3/1995 | Crooks |
| 5,406,307 A | 4/1995 | Hirayama et al. |
| 5,409,381 A | 4/1995 | Sundberg et al. |
| 5,413,486 A | 5/1995 | Burrows et al. |
| 5,417,575 A | 5/1995 | McTaggart |
| 5,438,168 A | 8/1995 | Wolfe et al. |
| 5,438,662 A | 8/1995 | Randall |
| 5,466,158 A | 11/1995 | Smith, III |
| 5,474,457 A | 12/1995 | Bromley |
| 5,480,306 A | 1/1996 | Liu |
| 5,484,292 A | 1/1996 | McTaggart |
| 5,485,176 A | 1/1996 | Ohara et al. |
| 5,509,087 A | 4/1996 | Nagamine |
| 5,510,606 A | 4/1996 | Worthington et al. |
| 5,517,579 A | 5/1996 | Baron et al. |
| 5,520,544 A | 5/1996 | Manico et al. |
| 5,561,446 A | 10/1996 | Montlick |
| 5,572,651 A | 11/1996 | Weber et al. |
| 5,575,659 A | 11/1996 | King et al. |
| 5,636,995 A | 6/1997 | Sharpe, III et al. |
| 5,686,705 A | 11/1997 | Conroy et al. |
| 5,717,939 A | 2/1998 | Bricklin et al. |
| 5,835,726 A | 11/1998 | Shwed et al. |
| 5,844,483 A | 12/1998 | Boley |
| 5,847,698 A | 12/1998 | Reavey et al. |
| 5,992,817 A | 11/1999 | Klitsner et al. |
| 6,020,895 A | 2/2000 | Azami |
| 6,144,371 A | 11/2000 | Clary et al. |
| 6,239,792 B1 | 5/2001 | Yanagisawa et al. |
| 6,275,301 B1 | 8/2001 | Bobrow et al. |
| 6,313,828 B1 | 11/2001 | Chombo |
| 6,418,326 B1 | 7/2002 | Heinonen et al. |
| 6,431,439 B1 | 8/2002 | Suer et al. |
| 6,456,749 B1 | 9/2002 | Kasabach et al. |
| 6,502,756 B1 | 1/2003 | Fahraeus |
| 6,529,920 B1 | 3/2003 | Arons et al. |
| 6,584,249 B1 | 6/2003 | Gu et al. |
| 6,641,401 B2 | 11/2003 | Wood et al. |
| 6,847,883 B1 * | 1/2005 | Walmsley et al. ............ 701/200 |
| 6,874,883 B1 | 4/2005 | Walmsley et al. |
| 6,965,454 B1 | 11/2005 | Silverbrook et al. |
| 6,966,495 B2 | 11/2005 | Lynggaard et al. |
| 7,134,606 B2 | 11/2006 | Chou |
| 7,202,861 B2 | 4/2007 | Lynggaard |
| 7,409,089 B2 * | 8/2008 | Simmons et al. ............ 382/186 |
| 7,421,439 B2 | 9/2008 | Wang et al. |
| 7,453,447 B2 | 11/2008 | Marggraff et al. |
| 2002/0060665 A1 | 5/2002 | Sekiguchi et al. |
| 2002/0077902 A1 | 6/2002 | Marcus |
| 2002/0120854 A1 | 8/2002 | LeVine et al. |
| 2003/0014615 A1 | 1/2003 | Lynggaard |
| 2003/0071850 A1 | 4/2003 | Geidl |
| 2003/0133164 A1 | 7/2003 | Tsai |
| 2003/0173405 A1 | 9/2003 | Wilz, Sr. et al. |
| 2004/0202987 A1 | 10/2004 | Scheuring et al. |
| 2004/0259067 A1 | 12/2004 | Cody et al. |
| 2005/0002053 A1 | 1/2005 | Meador et al. |
| 2005/0060644 A1 | 3/2005 | Patterson |
| 2005/0131803 A1 | 6/2005 | Lapstun et al. |
| 2005/0134926 A1 | 6/2005 | Takezaki et al. |
| 2005/0138541 A1 | 6/2005 | Euchner et al. |
| 2005/0211783 A1 | 9/2005 | Chou |
| 2006/0126105 A1 | 6/2006 | Sedky et al. |
| 2006/0146029 A1 | 7/2006 | Diercks |
| 2006/0159345 A1 | 7/2006 | Clary et al. |
| 2006/0242562 A1 | 10/2006 | Wang et al. |

FOREIGN PATENT DOCUMENTS

| | | |
|---|---|---|
| EP | 539053 | 4/1993 |
| EP | 1315085 A1 | 5/2003 |
| JP | 57-238486 | 3/1982 |
| JP | 61-46516 | 3/1986 |
| JP | 5-137846 | 6/1993 |
| JP | 5-217688 | 8/1993 |
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | 0183213 | 11/2001 |
| WO | WO 01/95559 A1 | 12/2001 |
| WO | 03067553 | 8/2003 |
| WO | 2004084190 | 11/2004 |

OTHER PUBLICATIONS

Web page; "What Works; Optical Scanner Pens;" at URL=http://newsletters.fen.com/whatworks/item/front/0,2551,1-13751-3363,00.html; printed Mar. 13, 2003; 2 pages.

"The Questron Electronic Wand;" 2 pages; Price, Stern, Sloan Publishers, Inc., Los Angeles Jul. 7, 2008.

British Micro, " Operating Guide to Grafpad", 1982, 28 pages.

Kramer, Translucent Patches-Dissolving Windows:, Nov. 2, 1994 Symposium on user interface software and technology, pp. 121-130, XP00197943.

Robertson G.G et al:,"Buttons As First Class Objects on an X Desktop", Nov. 11, 1991, UIST '91.4TH Annual Symposium on user interface software and technology. Proceedings of the ACM Symposium on user interface and technology. Hilton Head, SC, Nov. 11-13, 1991, ACM symposium on user interface software and technology, New Yo, pp. 35-44, XP000315064.

Stifelman, Lisa J. Augmenting Real-World Objects: A Paper-Based Audio Notebook. 1993. Speech Research Group, MIT Media Laboratory, Cambridge MA.

The Tools of Progress. [2001-06-19] [Retrieved Jun. 19, 2001] [Retrieved from the Internet] <URL:http://www.anoto.com/print_page.asp?cid=22>.

New Preschool Toys From Fisher-Price Give a Voice to Fun, Creativity and Interactive Play This Holiday Season'', Mattel, Inc: Investor Relations, http://www.shareholder.com/mattel/news/20000601-43282.cfm, 3pages.

Web Page; "Scan-A-Page or Word Lets Students Hear What They're Attempting to Read!;" at URL=http://www. brighteye.com/home.htm; printed Mar. 13, 2003; 1 page.

\* cited by examiner

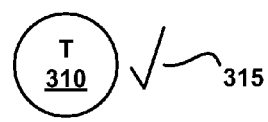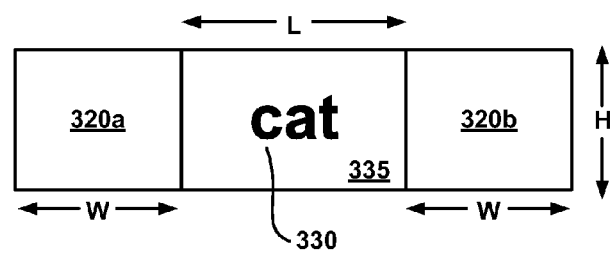
FIGURE 6B

METHOD AND SYSTEM FOR INVOKING COMPUTER FUNCTIONALITY BY INTERACTION WITH DYNAMICALLY GENERATED INTERFACE REGIONS OF A WRITING SURFACE

FIELD OF THE INVENTION

Embodiments of the present invention relate to the field of user interactive devices.

BACKGROUND OF THE INVENTION

In the last twenty years, the use of personal computing devices, such as desktop computer systems, laptop computer systems, handheld computers systems, and tablet computer systems, has grown tremendously. These personal computing devices provide users with a broad range of interactive applications, business utilities, communication abilities, and entertainment possibilities.

Current personal computing devices provide access to these interactive applications via a user interface. Typical computing devices have on-screen graphical interfaces that present information to a user using a display device, such as a monitor or display screen, and receive information from a user using an input device, such as a mouse, a keyboard, a joystick, or a stylus.

Even more so than computing systems, the use of pen and paper is ubiquitous among literate societies. While graphical user interfaces of current computing devices provide for effective interaction with many computing applications, typical on-screen graphical user interfaces have difficulty mimicking the common use of a pen or pencil and paper. For example, desktop and laptop computer systems typically do not have a pen-like interface. Moreover, input into a computer is shown on an electronic display, and is not tangible and accessible like information written on paper or a physical surface.

Finally, images and writings drawn with a pen-like interface on a paper surface have convenience, permanence, and tangibility, but do not allow for easy reuse of the markings on the paper surface once they have been written using the pen-like interface. In other words, some pen-like computer systems provide recognition of certain user written items on paper and once recognized, some immediate action may be taken by the pen-like computer system. However, if the user wants to perform that same computer function again, the item needs to be written again on the paper. Specifically, these pen-like computer user interfaces do not allow a user to directly interact with a written item on paper (e.g., select via a pen tap—much like a mouse click) to automatically invoke the computer function desired.

SUMMARY OF THE INVENTION

Accordingly, what is described is a user interface for an interactive device in which computer functionality is invoked by user interaction with dynamically generated interface regions associated with a writing surface. A computer system identifies a marking written on the writing surface or recognizes a user interaction with an existing written marking. Adjacent to the marking, the computer system automatically generates one or more interface regions associated with the marking. An interface region is defined in computer memory with respect to spatial coordinates of the writing surface and is invisible to the user. User interaction with one of these regions invokes prescribed computer functionality related to the interacted region and also related to the marking. A different computer function may be invoked by each interface region. The computer system dynamically positions and may dynamically size the interface regions based on the position (and size) of the associated marking. Multiple markings yield multiple regions, with different regions associated with respective markings. In one embodiment, the regions are established in front of and/or after a written word. Regions may also be established on top of and/or below the written word, for example. In another embodiment, the computer system is an interactive pen-based computer system.

In one particular example, an interactive pen-based computer system may be used to recognize a written word on a surface. In one application, the pen-based computer system provides a translation of that word from one language to another. After the word is written (or if the word exists and is selected), the computer system automatically generates, in memory, a first interface region on the surface spatially in front of the word and a second interface region on the surface spatially after the word. User interaction with the first region invokes a first computer functionality that is related to the first region and the word (e.g., the translation of the word is rendered by the computer in an audible form). User interaction with the second region invokes a second computer functionality that is related to the second region and the word (e.g., the translated version of the word is spelled out letter by letter in an audible form). It is appreciated that the interface regions may be located in any position adjacent to the written word and that the particular positions described herein are exemplary only. In one embodiment, the regions are sized such that their height is similar to the height of the written word and their width may be of a fixed nature or related to the size or shape of the written word.

Embodiments of the present invention also include processes for resolving interferences between interactive regions of different markings. These processes may include a sharing model, a time-out model, a pop-up model and/or a warn model. Embodiments of the present invention also include efficient processes for automatically computing the interactive regions as needed such that computer resources are conserved by not persistently storing every interactive region in memory at all times.

More specifically, embodiments of the present invention are directed to a computer implemented method of interfacing with a user, the method comprising: identifying that a marking has been made by a writing device on a surface; identifying a location of the marking on the surface and identifying a size of the marking; automatically computing a location and a size of a first interface region, wherein the first interface region is located adjacent to the marking; associating a first computer function with the first interface region; and in response to a user selection of the first interface region, performing the first computer function on data associated with the marking. Embodiments include the above and further comprising: automatically computing a location and a size of a second interface region of the surface wherein the second interface region is positioned adjacent to the marking and does not overlap the first interface region; associating a second computer function with the second interface region; and in response to a user selection of the second interface region, performing the second computer function on the data. Embodiments include the above and wherein the first interface region is positioned spatially to the left of the marking and wherein further the second interface region is positioned spatially to the right of the marking.

Embodiments also include a computer implemented method of interfacing with a user, the method comprising:

identifying that a written marking has been selected by a user, wherein the written marking is located on a writing surface; accessing from memory an interface region associated with the written marking; automatically computing a location and a size of a first interface region, wherein the first interface region is located adjacent to the written marking; associating a first computer function with the first interface region; and in response to a user selection of the first interface region, performing the first computer function on data associated with the written marking. Embodiments also include the above and further comprising: automatically computing a location and a size of a second interface region of the surface wherein the second interface region is positioned adjacent to the marking and does not overlap the first interface region; associating a second computer function with the second interface region; and in response to a user selection of the second interface region, performing the second computer function on the data. Embodiments also include the above and wherein the first interface region is positioned spatially to the left of the written marking and wherein further the second interface region is positioned spatially to the right of the written marking.

Embodiments are also directed to an interactive device programmed in accordance with above.

BRIEF DESCRIPTION OF THE DRAWINGS

FIG. 6B is an illustration of a writing surface having exemplary markings written thereon comprising a user interface for a pen based computer device in accordance with an embodiment of the present invention.

DETAILED DESCRIPTION

Figure 1:
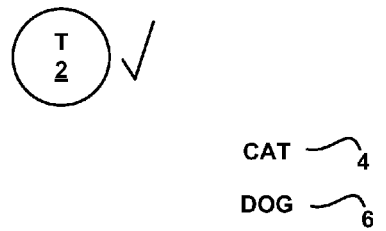
FIG. 1 is a diagram of user interface of a pen computer system.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions, which follow, are presented in terms of procedures, steps, logic blocks, processing, and other symbolic representations of operations on data bits that can be performed on computer memory. For instance, processes 500, 550, 600 and 700. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the invention, discussions utilizing terms such as "recognizing" or "initiating" or "conveying" or "embedding"

or "coupling" or "accessing" or "identifying" or "receiving" or "outputting" or "generating" or "determining" or "associating" or "storing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Drawn User Interface

FIG. 1 illustrates exemplary user written markings, e.g., on a writable surface, that constitute a user interface for a pen-based computer system. In this example, the computer system has been instructed to execute a language translation application program, e.g., from one language (English) to another (Spanish). This application may be invoked by the user drawing a special marking 2 which is a "T" with a circle, in this example. An optional check mark next to this marking 2 may also be used to select parameters of the application; these parameters may be scrolled through (e.g., by sequential audio rendition) in response to a user tapping on the marking 2 with the tip of the pen computer. After the desired parameter has been announced, the user can draw a check mark to select it.

In response to a user writing a word, e.g., "cat" 4, the application program automatically announces the Spanish translation, "gato." The same may occur for the written word "dog," e.g., the computer announces "perro." In this application, if the user wants the translation to be repeated, a user written interface item 10 needs to be written on the paper. When the user selects this item 10 with the pen tip, the computer will announce the translation of the most recent selected word, e.g., cat 4 or dog 6. If the user wants the translated word spelled out in letters, then a selection of written item 8 will perform this function. Again, the most recently selected word will be spelled out.

Unfortunately, for frequently executed or core functions, it can become user-tedious to select the word, then go over to some other part of the paper and select a separate drawn function item, e.g., item 8 or 10, to apply to that word. The user, in this case, may find himself/herself constantly tapping over the paper to engage in the translations and/or spelling functions. Also, if the user wants only to translate one or two words, the user interface overhead for doing the example of FIG. 1 may appear to be quite large. For instance, the user needs to draw the item 2 to invoke the translation application, then write the translate item 10, then optionally write the spell item 8, then draw the word to be translated, e.g., cat 4 and tap on item 8 or 10. It would be advantageous to provide a user interface that accomplishes the same functions but requires less user drawn items. Lastly, each item drawn on the paper that has persistence within the computer system will consume computer resources. It would be advantageous to provide a user interface that does not require items 8 and 10 to be specifically drawn such that they do not need to consume computer system memory.

As described further below, embodiments of the present invention provide an advantageous user interface for drawn items that eliminate the shortcomings described above.

Examplary Device Platform for Embodiments of the Present Invention

Figure 2:
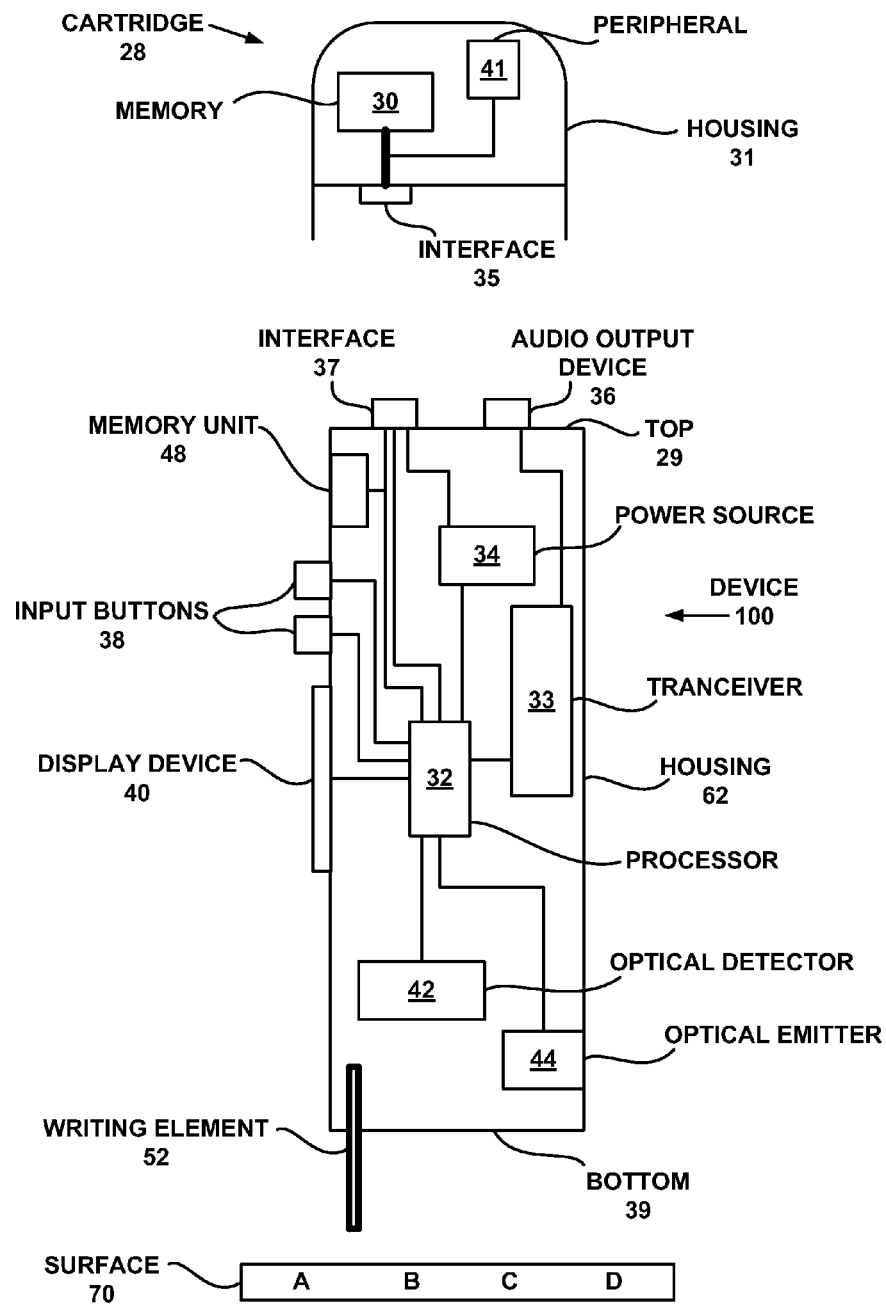
FIG. 2 is a block diagram of an electronic interactive device upon which various embodiments of the invention can be implemented.

FIG. 2 is a block diagram of an electronic interactive device 100 upon which various embodiments of the invention can be implemented. In general, device 100 may be referred to as a pen-shaped, or pen-based, or pen-like computer system or an optical device, or more specifically as an optical reader, optical pen or digital pen or pen computer.

In the embodiment of FIG. 2, device 100 includes a processor 32 inside a housing 62. In one embodiment, housing 62 has the general form and shape of a pen or other writing utensil or writing instrument. Processor 32 is operable for processing information and instructions used to implement the functions of device 100, which are described below. Additionally, processor 32 can be operable for processing information and instructions used to implement the functions associated with any memory or functional cartridge (e.g., 28) coupled to device 100.

In one embodiment, the device 100 may include an audio output device 36, a display device 40, or both an audio device and display device may be coupled to the processor 32. In other embodiments, the audio output device and/or the display device are optional or are physically separated from device 100, but in communication with device 100 through either a wired and/or wireless connection. For wireless communication, device 100 can include a transmitter or transceiver 33. The audio output device 36 may include a speaker or an audio jack (e.g., for an earphone or headphone). The display device 40 may be a liquid crystal display (LCD) or some other suitable type of display.

In the embodiment of FIG. 2, device 100 may include input buttons 38 coupled to the processor 32 for activating and controlling the device 100. For example, the input buttons 38 allow a user to input information and commands to device 100 or to turn device 100 on or off. Device 100 can also include a power source 34 such as a battery, but is not limited to such.

Device 100 can also include a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 can be received at and recorded by optical detector 42.

In one embodiment, a pattern of markings is printed on surface 70 for use in conjunction with device 100. The surface 70 may be any suitable surface on which a pattern of markings can be printed (or formed or deposited), such as a sheet a paper or other types of surfaces. The bottom end 39 of device 100 that can hold optical emitter 44 and optical detector 42 is placed against or near surface 70. As device 100 is moved relative to the surface 70, the pattern of markings can be read, recorded and identified by optical emitter 44 and optical detector 42. As discussed in more detail further below, in one embodiment, the markings on surface 70 are used to determine the position of device 100 relative to surface 70 (e.g., see FIGS. 3 and 4). In another embodiment, the markings on surface 70 may be used to encode information; the captured images of surface 70 can be analyzed (processed) by device 100 to decode the markings and recover the encoded information.

Device 100 of FIG. 2 can also include a memory unit 48 coupled to the processor 32. In one embodiment, memory unit 48 is a removable memory unit embodied as a memory cartridge or a memory card. In another embodiment, memory unit 48 can include volatile memory and/or non-volatile memory for storing information and instructions for processor 32. For example, memory unit 48 can include, but is not limited to, random access memory (RAM) and/or read-only memory (ROM) for storing information and instructions for processor 32.

In the embodiment of FIG. 2, device 100 can include a writing element 52 situated at the same end (e.g., 39) of device 100 as the optical detector 42 and the optical emitter 44. Writing element 52 can be, for example, a pen, pencil, marker, stylus, or the like, and may or may not be retractable. In certain applications, writing element 52 is not needed. In other applications, a user can use writing element 52 to make marks, markings, on surface 70, including characters such as letters, numbers, symbols, designs, and the like. These user-produced marks can be scanned (e.g., imaged) and interpreted by device 100 according to their positions on surface 70. The positions of the user-produced marks can be determined using the pattern of marks that are printed on surface 70 (e.g., refer to the discussion of FIGS. 4 and 5, below). In one embodiment, the user-produced markings can be interpreted by device 100 using optical character recognition (OCR) techniques that recognize handwritten characters.

Surface 70 may be a sheet of paper, although surfaces consisting of materials other than paper may be used. Surface 70 may be a flat panel display screen (e.g., an LCD) or electronic paper (e.g., reconfigurable paper that utilizes electronic ink). Also, surface 70 may or may not be flat. For example, surface 70 may be embodied as the surface of a globe. Furthermore, surface 70 may be smaller or larger than a conventional (e.g., 8.5×11 inches) page of paper. In general, surface 70 can be any type of surface upon which markings (e.g., letters, numbers, symbols, characters, etc.) can be printed or otherwise deposited. Alternatively, surface 70 can be a type of surface wherein a characteristic of the surface changes in response to action on the surface by device 100 such that markings appear visible.

FIG. 2 also shows an exemplary cartridge 28 that can be utilized in combination with device 100 in accordance with various embodiments of the invention. Specifically, by coupling (or connecting) cartridge 28 to device 100, the cartridge 28 can expand the functionality of device 100 by enabling the download of a copy of one or more applications from its memory 30 to memory 48 of device 100 that can be used in combination with specific portions of surface 70. As such, device 100 is able to utilize the one or more applications it receives from cartridge 28.

Specifically, in accordance with one embodiment of the invention, cartridge 28 can include a memory 30, functional logic, an interface 35 along with an optional peripheral 41 that can all be located within a cartridge housing 31. In one embodiment, the cartridge housing 31 can have the form of a pen cap or a cap for a writing instrument or utensil (e.g., device 100). For example, in one embodiment, the cartridge housing 31 can be designed to securely fit over a top portion 37 and a bottom portion 39 of the housing 62 of device 100. As such, the housing 31 of cartridge 28 can shaped such that it can be fit securely to device 100 in a manner similar to when a pen cap is fit securely to a pen. Specifically, housing 31 of cartridge 28 can be designed to fit securely onto the top portion 37 of the housing 62 of device 100. Furthermore, housing 31 of cartridge 28 can be designed to also fit securely onto the bottom portion 39 of the housing 62 of device 100, thereby enabling cartridge 28 to be utilized as a cap (or cover) for device 100 for covering and/or protecting writing element 52, optical detector 42 and/or optical emitter 44. It is appreciated that when cartridge 28 can be passively stored when is securely fit to bottom portion 39 of device 100.

Within FIG. 2, device 100 can include an interface 37 for enabling a cartridge (e.g., 28) to be coupled to device 100. It is appreciated that when the housing 31 of cartridge 28 is securely fit onto top portion 37 of housing 62 of device 100, interface 35 of cartridge 28 can electrically couple to interface 37 of device 100. When coupled in this manner, cartridge 28 can be coupled to the processor 32, power source 34 and memory unit 48 of device 100. As such, in one embodiment, processor 32 of device 100 can automatically download from memory 30 of cartridge 28 a copy of any resident applications to memory 48 of device 100 to be stored thereon. It is appreciated that a copy of all (or part) of the above information stored by memory 30 can be downloaded to memory 48 of device 100 to be stored thereon. In one embodiment, after the one or more applications along with any other information have been downloaded from memory 30 of cartridge 28 into memory 48 of device 100, the cartridge 28 can be removed (or uncoupled) from device 100. Note that even though cartridge 28 is uncoupled from device 100, it is noted that device 100 can still utilize the one or more applications along with any other information that was downloaded from cartridge 28.

Cartridge 28 can also optionally include one or more peripherals (e.g., 41) that can be associated with one or more applications stored by cartridge 28. For example, the optional peripheral 41 can be implemented as, but is not limited to, a rumble pack, a light-emitting diode (LED), an upgraded display, an upgraded speaker, and the like. Peripheral 41 can be coupled to device 100 via interface 35 of cartridge 28. It is understood that memory 30 of cartridge 28 can be implemented in a wide variety of ways. For example, memory 30 can be implemented with, but is not limited to, flash memory, programmable read-only memory (PROM), erasable programmable read-only memory (EPROM), electrically erasable programmable read-only memory (EEPROM), and/or any other non-volatile memory that can store data after being disconnected from an electrical source for long time periods.

Figure 3:
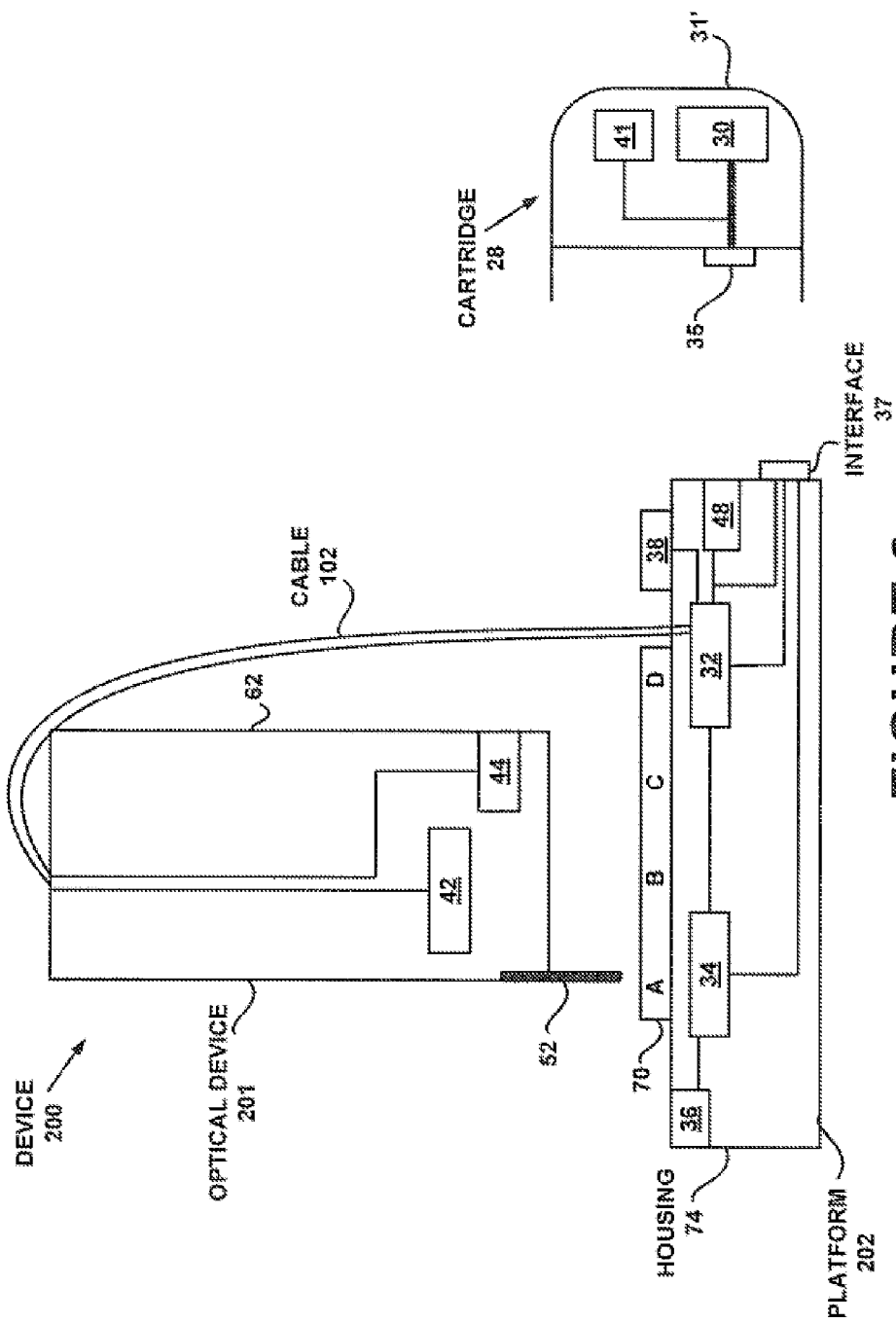
FIG. 3 is a block diagram of another electronic interactive device upon which various embodiments of the invention can be implemented.

FIG. 3 is a block diagram of another electronic interactive device 200 upon which various embodiments of the invention can be implemented. Device 200 includes processor 32, power source 34, audio output device 36, input buttons 38, memory unit 48, optical detector 42, optical emitter 44, writing element 52 and interface 37, previously described herein. However, in the embodiment of FIG. 2, optical detector 42, optical emitter 44 and writing element 52 are embodied as optical device 201 in housing 62, and processor 32, power source 34, audio output device 36, input buttons 38, interface 37 and memory unit 48 are embodied as platform 202 that includes housing 74. In the present embodiment, optical device 201 is coupled to platform 202 by a cable 102; however, a wireless connection can be used instead. The elements illustrated by FIG. 3 can be distributed between optical device 201 and platform 200 in combinations other than those described above.

Additionally, FIG. 3 also shows cartridge 28 that can include memory 30, interface 35, and optional peripheral 41, previously described herein. Moreover, also cartridge 28 can include housing 31' that is shaped to enable cartridge 28 to be securely coupled to side 204 of the housing 74 of platform 202. Note that housing 31' has a different shape than housing 31 of FIG. 1. In one embodiment, if interface 37 is implemented as part optical device 201, housing 31' of cartridge 28 can be modified such that it can enable cartridge 28 to be securely coupled to optical device 201.

Figure 4:
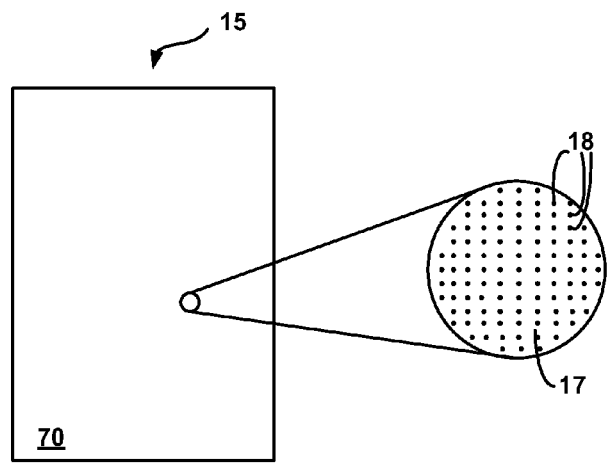
FIG. 4 shows an exemplary sheet of paper provided with a pattern of marks according to one embodiment of the invention.

FIG. 4 shows a sheet of paper 15 provided with a pattern of marks according to one embodiment of the invention. In the embodiment of FIG. 4, sheet of paper 15 is provided with a coding pattern in the form of optically readable position code 17 that consists of a pattern of marks 18. The marks 18 in FIG. 4 are greatly enlarged for the sake of clarity. In actuality, the marks 18 may not be easily discernible by the human visual system, and may appear as grayscale on sheet of paper 15. In one embodiment, the marks 18 are embodied as dots; however, the invention is not so limited. The marks 18 create a spatial grid for the surface 70. Upon a pen down, the interactive device (100 or 200) can identify a unique pattern of the marks 18 that are near the pen tip position. This unique pattern also identifies the location, on surface 70, at which the pen tip resides.

Figure 5:
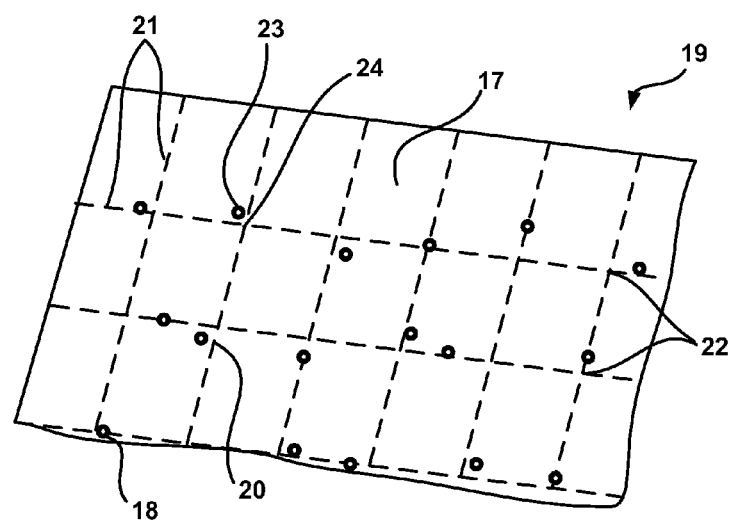
FIG. 5 shows an enlargement of a pattern of marks on an exemplary sheet of paper according to one embodiment of the invention.

FIG. 5 shows an enlarged portion 19 of the position code 17 of FIG. 3 according to one embodiment of the invention. An optical device such as device 100 or 200 (FIGS. 2 and 3) can be positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined. Additional information is provided by the following patents and patent applications, herein incorporated by reference in their entirety for all purposes: U.S. Pat. No. 6,502,756; U.S. patent application Ser. No. 10/179,966 filed on Jun. 26, 2002; WO 01/95559; WO 01/1473; WO 01/75723; WO 01/26032; WO 01/75780; WO 01/01670; WO 01/75773; WO 01/71475; WO 01/73983; and WO 01/16691. See also Patent Application No. 60/456,053 filed on Mar. 18, 2003, and patent application Ser. No. 10/803,803 filed on Mar. 17, 2004, both of which are incorporated by reference in their entirety for all purposes.

With reference back to FIG. 2, four positions or regions on surface 70 are indicated by the letters A, B, C and D (note that these characters are not printed on surface 70, but are used herein to indicate positions on surface 70). There may be many such regions on the surface 70. Associated with each region on surface 70 is a unique pattern of marks. The regions on surface 70 may overlap because even if some marks are shared between overlapping regions, the pattern of marks in a region is still unique to that region.

In the example of FIG. 2, using device 100 (specifically, using writing element 52), a user may create a character consisting, for example, of a circled letter "M" at position A on surface 70 (generally, the user may create the character at any position on surface 70). The user may create such a character in response to a prompt (e.g., an audible prompt) from device 100. When the user creates the character, device 100 records the pattern of markings that are uniquely present at the position where the character is created. The device 100 associates that pattern of markings with the character just created. When device 100 is subsequently positioned over the circled "M," device 100 recognizes the pattern of marks associated therewith and recognizes the position as being associated with a circled "M." In effect, device 100 recognizes the character using the pattern of markings at the position where the character is located, rather than by recognizing the character itself.

In one embodiment, the character is associated with a particular command. In the example just described, a user can create (e.g., write) a character that identifies a particular command, and can invoke that command repeatedly by simply positioning device 100 over the written character. In other words, the user does not have to re-write the character for a command each time the command is to be invoked; instead, the user can write the character for a command one time and invoke the command repeatedly by using, e.g., selecting with the pen tip, the same written character.

FIG. 5 shows a region of dots on a surface 19 (on a sheet of paper, for example) that can be used to store encoded information according to one embodiment of the invention. In order to read this information, the pen-based computer 100 is placed down on any portion of the region. Although the example of FIG. 5 shows a sheet of paper, embodiments in accordance with the invention can be implemented on other types and shapes of surfaces made of various types of materials, as mentioned above.

Region includes a pattern of marks such as dots. In the embodiment, the pattern is decoded to obtain a unique location within a larger map area. The location may be of an (x,y) coordinate pair. The surface of this region can include yet other information. For example, the surface may contain text-based or image-based information printed thereon in conjunction with the dot pattern. As a specific example, the surface may be a page that may include one or more pictures as well as the patterns of markings referred to above that can be utilized in combination with one or more applications stored by cartridge 28. The information encoded by the pattern of marks in the region can be used in a variety of different ways. For instance, the decoded location information may be used to identify an application associated with that location.

Drawn User Interface in Accordance with the Present Invention

Figure 6A:
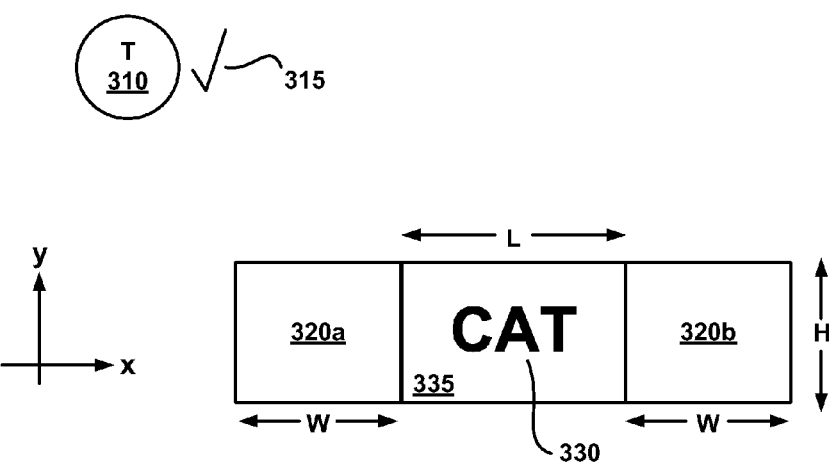
FIG. 6A is an illustration of a writing surface having markings written thereon comprising a user interface for a pen computer device in accordance with one embodiment of the present invention for automatically generating active regions.

FIG. 6A illustrates an exemplary written user interface in accordance with an embodiment of the present invention. The interactive device, as described above, may be used to create markings as shown in FIG. 6A. For instance, to invoke an application, the user may draw the marking 310 (circle "T") with optional adjacent check mark 315. In one embodiment, this invokes the translation or translator application. In another embodiment, the application may be a dictionary application, or any other application that accepts user drawn input. According to embodiments of the present invention, the user is then allowed to draw or write a marking or word, e.g., cat 330, using the writing device. In response to this, the interactive computer generates a spatial boundary 335 around the written word 330, e.g., a rectangle in this example. This may be done by computing a rectangle defined by the maximum coordinate (x,y) to the minimum coordinate (x,y) of the spatial area of the written word. The result is a boundary 335 of length, L, (max x minus min x) and height, h, (max y minus min y). The boundary 335 may also be called a "word region" or "word interface region" or a "spatial boundary."

In accordance with embodiments of the present invention, the interactive computer then automatically generates, in memory, invisible interface regions 320a and 320b that are adjacent to the boundary 335 (and therefore adjacent to the written word 330). Each of the interface regions 320a and 320b is of width, w, and height, h. In this example, the height of each of the interface regions is defined to be of the same height as the boundary 335. In one embodiment, the width may be a fixed width, or it may be dependent on the width and/or height of the boundary 335. It is appreciated that interface regions of a same written word do not overlap spatially with each other and do not overlap with their associated boundary.

It is appreciated that each interface region has assigned thereto a special computer function. For instance, in one embodiment, the interface region 320a, when selected by the user, causes the associated word 330 to be translated. In this example, translation means an audible announcement of the translation of cat, e.g., "gato" in Spanish (for an English to Spanish translation). In one embodiment, user selection of an interface region means a user tapping the tip of the interactive device within that region. Selection may also mean the user double tapping and/or writing a symbol or other marking within the region. Furthermore, when the user selects region 320b, this causes the associated word 330 to be spelled out, e.g., "g," "a," "t" and "o" in audible announcements. Therefore, the translate function is associated with interface region 320a and the spell function is associated with interface region 320b. Further, both computer functions automatically operate on the associated word 330 for these two interface regions. It is also appreciated that similarly positioned interface regions of different words generally have associated therewith the same computer functionality but operate on their associated word.

The boundary or word interface region 335 is also an active region. In other words, if the written word 330 has multiple translations, then the user can select the appropriate translation by rotating through the list of translations, one by one, by tapping within the interface region 335. In this embodiment, each tap causes the announcement of the next translation, in round-robin fashion. In this case, the interface regions 320a and 320b will operate on the last translation selected by the user.

It is appreciated that any function could be associated with an interface region and any application may make use of such functionality. For instance, instead of a translation application, a dictionary application may be used. In this case, the active regions may invoke a computer function that defines the associated word, or provides a antonym or synonym or cognate or similar word for the associated word. These functions may be assigned in any fashion to the interface regions 320a and 320b.

It is appreciated that the interface regions 320a and 320b are not only generated upon the user writing the associated word 330, but may also be generated automatically at any time the user selects the word 330, e.g., by tapping within boundary 335.

One advantage of the use of automatically generated interface regions 320a and 320b is that the user does not need to separately draw translate and/or spell markings (as shown in FIG. 1). Rather, once the target word 330 has been drawn, the user merely taps in front of or after the word to invoke the expected functionality.

FIG. 6B illustrates that the written word 330 may be of unusual size, e.g., the letters may not be regular sized. In this case, the last letter, t, is larger than the remainder of the letters of the written word. In this case, the word active region or spatial boundary 335 is stretched in height to encompass the last letter, t. Also, note that the height, h, of the interface regions 320a and 320b is also made to match the height, h, of the boundary 335. Again, the width, w, of the interface regions 320a and 320b may be of a fixed width (e.g., _inch, etc.) or may be dependent on the height, h, or width, L, of the boundary 335.

Figure 7A:
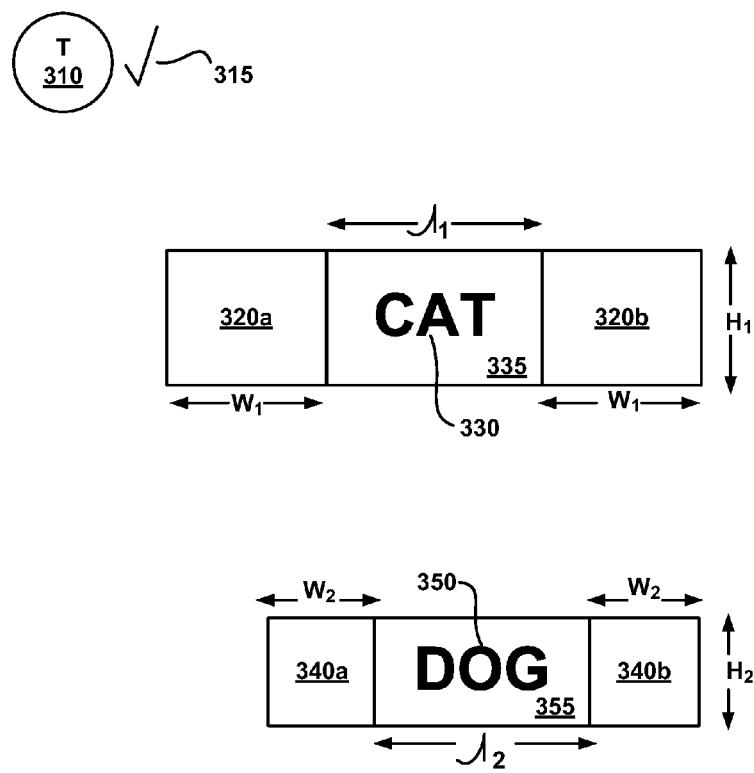
FIG. 7A is an illustration of a writing surface having two exemplary markings written thereon each with associated active regions in accordance with an embodiment of the present invention wherein the active regions are sized both in height and width according to their respective marking.

As shown in FIG. 7A, new interface regions are defined for each written word made by the user. FIG. 7A illustrates two written words, cat 330 and dog 350. The same interface regions 320a and 320b of FIG. 6A are shown for written word 330. However, upon the user writing the word dog 350, the interactive computer automatically defines the word boundary 355 and also automatically generates interface regions 340a and 340b on either side of their associated word 350. As discussed above, the height, h2, of each interface region is the same as the height of the boundary 355. Also, the width, w2, of each interface region may be fixed or it may be dependent on the height, h2, or width, 12, of the associated boundary 355.

It is appreciated that generally within the same application program, interface regions of the same spatial position of different marking have the same computer functionality. In other words, interface regions 320a and 340a both have the same computer functionality, but operate on their respective markings, 330 and 350. More specifically, according to one embodiment, within a same application program, the same computer functions are assigned to the interface regions 340a and 340b as discussed with respect to FIG. 6A. In other words, assuming the translator application is operational, then the translate function is assigned to interface region 340a and the spell function is assigned to interface region 340b. The difference here is that each respective computer function will be operable on the associated word dog 350. When interface region 340a is selected by the user, then the computer announces the Spanish translation of dog which is "perro." Also, if interface region 340b is selected by the user, then the translation of dog is spelled out, e.g., "p," "e," "e," "r" and "o."

It is appreciated that in the example of FIG. 7A, the width of the interface regions are dependent on the size of their associated word. In other words, the size of the written word dog 350 is smaller than the size of the written word cat 330. Therefore the width w2 of the interface regions 340a and 340b is smaller than the width, w1, of interface regions 320a and 320b. In accordance with embodiments of the present invention, the width of the interface region can be dependent on either the width and/or height of the associated word or a function thereof. Also, the height of the interface regions is set to match the height of their associated word.

Figure 7B:
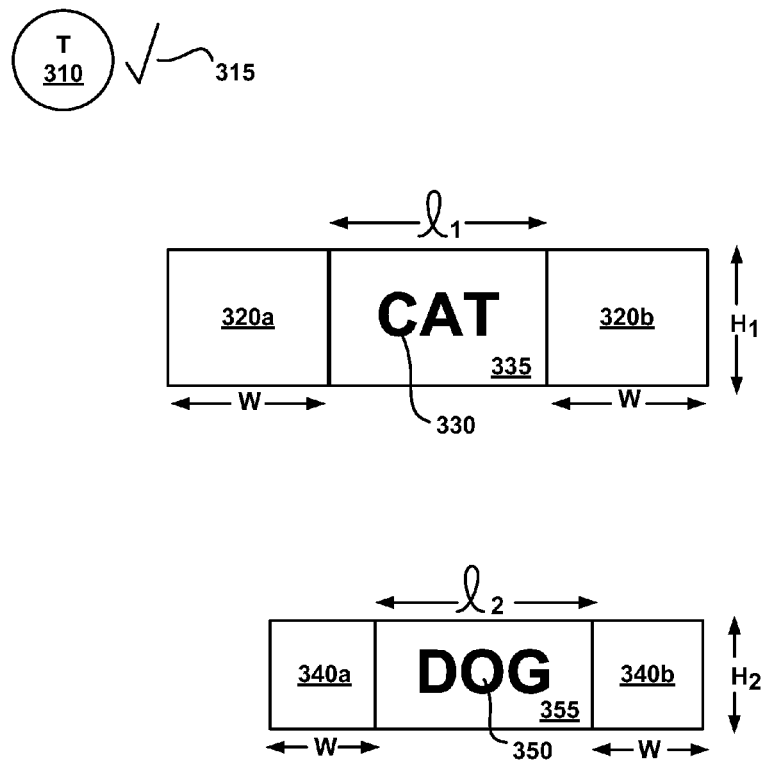
FIG. 7B is an illustration of a writing surface having two exemplary markings written thereon each with associated active regions in accordance with an embodiment of the present invention wherein the active regions are sized in height according to their respective marking and fixed in width.

FIG. 7B illustrates an example similar to FIG. 7A except that the widths of the interface regions is fixed and is not dependent on the size of the associated word. Here, the width of interface region 320a is the same as the width of interface region 340a even though the written word cat is larger than the written word dog 350. However, the height of the interface regions is set to match the height of their associated word, as shown by h1 and h2. The fixed width can be of any reasonable size, and in one embodiment the width is about 0.25 to 1.0 inch, but could be any size that is readily selectable by a user with a standard writing instrument tip size.

Embodiments of the present invention may persistently store the word boundaries 335 and 355 in computer memory, but may or may not persistently store the interface regions (320a, 320b, 340a, 340b) in memory in an effort to save computer resources, e.g., memory and processing power. In other words, once the word boundaries are known and saved, the interface regions can be quickly computed when needed, so therefore they do not necessarily need to be persistently stored in memory while their target application is active. In one embodiment, the active regions for an associated word are only saved (e.g., held in memory) for the last word used and the interface regions associated with another word, that is not the last word used, are quickly computed when the user interacts with that word. In this fashion, only a few interface regions need be active at any time.

Figure 8:
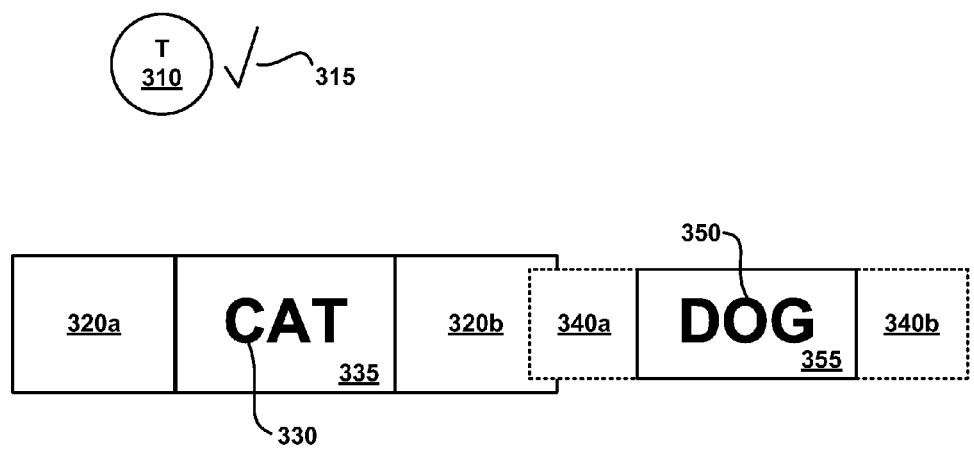
FIG. 8 is an illustration of active regions of two different marking interfering with each other spatially.

FIG. 8 illustrates a case in which interface regions of different written words overlap each other. This is a condition that should be avoided because ambiguities may arise regarding the expected computer function when the user selects within an overlap area. Unexpected results may occur if these types of overlaps are allowed to occur. Embodiments of the present invention provide for many resolutions to avoid interface overlap. First, when detecting that a second written word (e.g., dog 350) is being written too close to an existing written word (e.g., cat 330), one embodiment announces to the user that the second word is too close, e.g., "Please write your word farther away from existing words" or "Please write the new word farther to the right," etc. In this case, the overlapping interface region 340a never really becomes generated because the user is instructed to write dog 350 elsewhere to avoid the overlap. This is the "warn" embodiment.

In another embodiment, the interactive computer allows the user to complete writing the second word, dog 350, and merely adjusts (e.g., shrinks) interface regions 320b and 340a in width (or height as the case may be in some instances) such that they no longer overlap, e.g., they share the space between boundaries 335 and 355. This is the "sharing" embodiment.

In yet another embodiment, the interactive computer allows interface region overlap because only the interface regions for the latest written and/or selected word are active at any time. This is referred to as "pop-up" interface regions. For instance, once the user writes dog 350, then interface regions 340a and 340b are generated and made active. However, the existing interface regions 320a and 320b are then deactivated. Therefore, among active interface regions, there is no overlap between regions 320b and 340a because interface region 320b is not currently active at this point. Selection within any point of region 340a will therefore not cause an unexpected computer function because the function associated with region 340a will execute. Moreover, if the user next selected within boundary 335, then interface regions 320a and 340a would become active (e.g., "pop-up" to the surface) and interface regions 340a and 340b would be rendered inactive, and again, no overlap condition remains.

In another embodiment, if an overlap condition occurs, then the interface region that was last drawn (most recent) controls and the other interface region becomes inactive. This is the "Z-ordering" embodiment in which the interface regions with the largest Z value (an analogy from computer graphics processing) remain active when overlapping with others. In the case of FIG. 8, interface region 340a would control and interface region 320b would be inactive since dog 350 was written after cat 330.

In another embodiment, interface regions "time-out" after a period of time. Therefore, assume that cat 330 was written and interface regions 320a and 320b were generated and remained active. A time-out period is defined. If no interactions occur with interface regions 320a and 320b or with boundary 355 over the time-out period, then interface regions 320a and 320b become deactivated. If region 340a is generated after region 320b becomes deactivated due to time-out, then no overlap condition exists.

Figure 9:
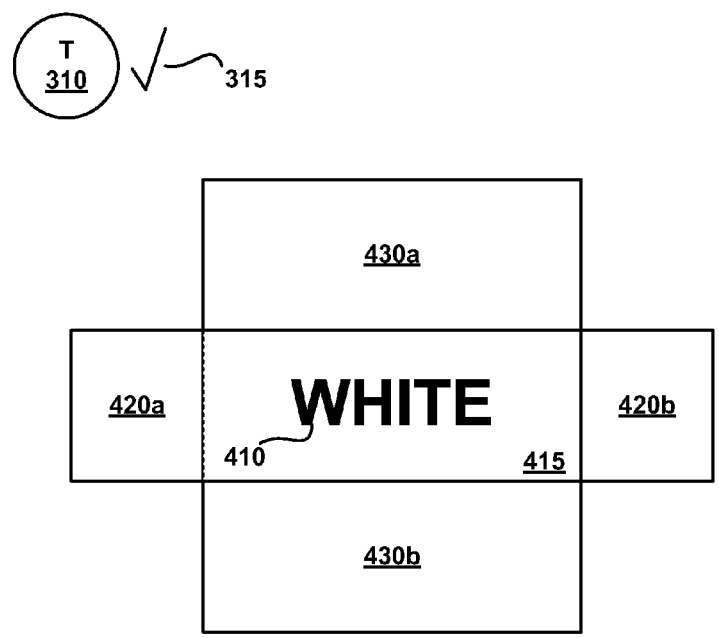
FIG. 9 is an illustration of a writing surface having a marking written thereon and four exemplary active regions which are automatically generated in accordance with an embodiment of the present invention.

FIG. 9 illustrates that interface regions may also be defined for regions above and below the written word. In this example, interface regions 430a and 430b are defined above and below the written word "white" 410. In this case the width of the interface regions 430a and 430b is the same as the width of the boundary 415 defined for the written word 410. The height of the interface regions 430a and 430b can be of a fixed dimension or may be dependent on the height and/or width of the associated written word 410. As discussed above, interface regions may also be defined for the left and right sides, e.g., interface regions 420a and 420b.

In this particular example, four interface regions are automatically defined with respect to the written word 410. In this case, the application may be a dictionary application with computer functions such as 1) definition; 2) antonym; 3) synonym; and 4) cognate being assigned, respectively, to the interface regions 430a, 430b and 420a, 420b in any order.

It is appreciated that although particular examples have been given for placement of the interface regions, embodiments of the present invention are well suited for any spatial placement of an interface region that is adjacent to the written word and is therefore visibly associated with the word. The interface region placement of left, right, up and down are merely exemplary. Also, the sizes of the interface regions may also be varied within the scope of the present invention. The interface regions may be of fixed width, variable width, or a combination of both. Also, rectangular areas have been described as shapes for the interface regions. However, these are exemplary only and other well known geometric shapes can be adopted, e.g., circular, triangular, irregular etc. Also, written words have been used as examples for triggering the generation of interface regions. However, any written item can be used to trigger interface region generation, e.g., numbers, letters, equations, graphics, names, diagrams, etc. Lastly, exemplary applications such as translator, dictionary, etc. have been described herein. These are exemplary only. Any application may be used within the scope of the present invention that offers computer functions that take the meaning (interpretation) of written items as input.

Figure 10A:
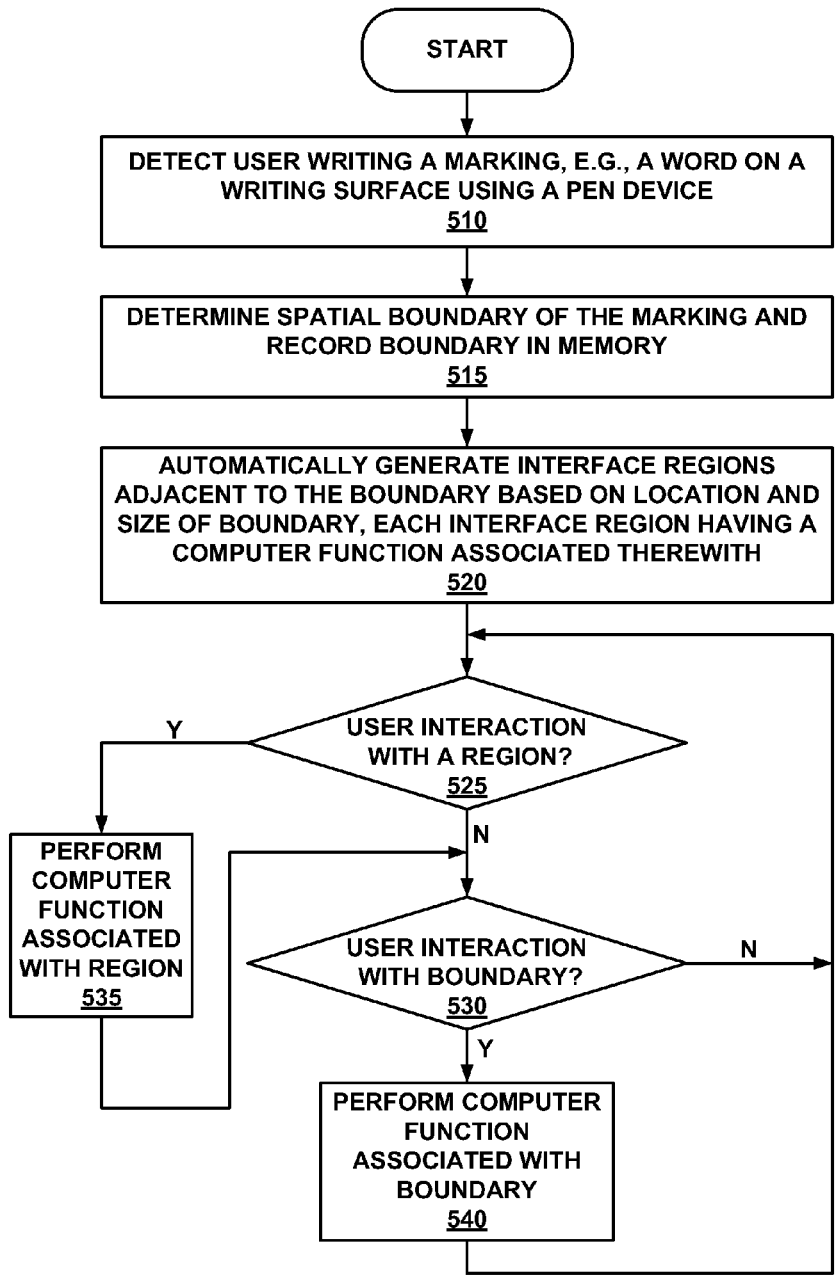
FIG. 10A is a flow diagram of a computer implemented process for automatically generating interface regions associated with a writing in response to the user writing the marking in accordance with an embodiment of the present invention.

FIG. 10A illustrates a computer implemented process 500 for generating and user interface regions as described herein. Process 500 may be implemented on the interactive devices described with respect to FIG. 2 and FIG. 3. In one embodiment, process 500 may be implemented as computer code stored within memory units of the interactive device and executed on the processor thereof. Process 500 focuses on generating interface regions in response to written words being written by the user.

At step 510, the computer detects that a user writes a marking, e.g., a word, on a writing surface, e.g., paper, etc. The spatial boundary (or "word boundary") of the word is then computed, e.g., that of a rectangle encompassing the word. The spatial boundary for the written word is then recorded into memory at step 515. At step 520, interface regions (active regions) are automatically generated that are adjacent to the spatial boundary. The interface regions are positioned adjacent to the spatial boundary therefore the locations of the interface regions are dependent on the location of the spatial boundary. Also, in one embodiment the height of the interface regions is matched to the height of the spatial boundary, so the sizes of the interface regions are dependent on the size of the spatial boundary and therefore also dependent on the size of the written word. Each interface region has a particular computer function associated therewith that depends on the currently operating application program.

At step 525, a check is made if a user interacts with one of the interface regions (e.g., taps or double taps or writes within one of the interface regions). If not, then step 530 is entered but if so, then at step 535 the computer function associated with the selected interface region is executed with respect to the written word associated with the selected interface region. User interaction is then checked against the spatial boundary of the written word at step 530. If so, then a computer function associated with the spatial boundary is performed with respect to the associated written word. The process then repeats at 525 until another written word is made, at which time step 510 is entered in response to the new word being written.

Figure 10B:
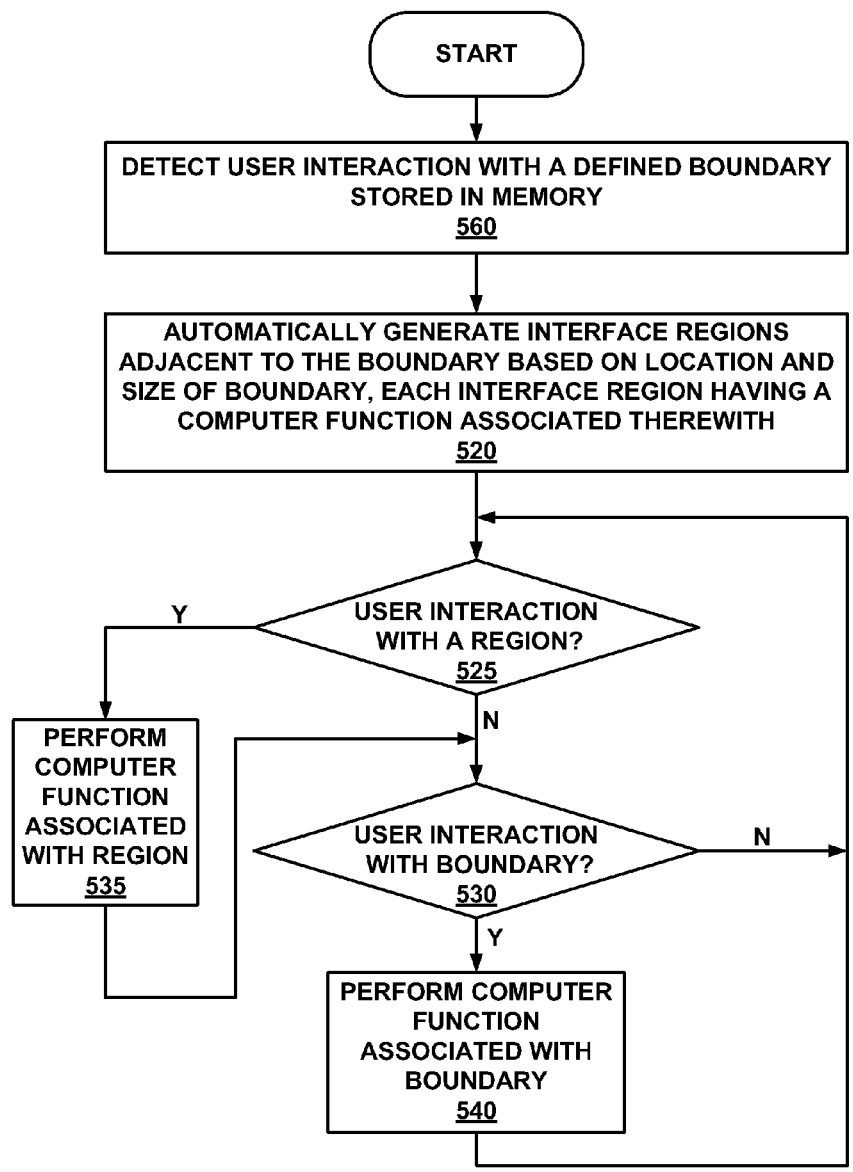
FIG. 10B is a flow diagram of a computer implemented process for automatically generating interface regions associated with a writing in response to the user selecting an existing writing in accordance with an embodiment of the present invention.

FIG. 10B illustrates a computer implemented process 550 for generating and user interface regions as described herein. Process 550 may be implemented on the interactive devices described with respect to FIG. 2 and FIG. 3. In one embodiment, process 550 may be implemented as computer code stored within memory units of the interactive device and executed on the processor thereof. Process 550 focuses on generating interface regions in response to a user selecting an existing written word. In this case, it is assumed that one or more written words have already been generated (e.g., by function of process 500 of FIG. 10A). Spatial boundaries associated with these written words are then stored in memory. The assumption here with respect to FIG. 10B is that the interface regions of written words may not all be persistently stored in memory. However, once a written word is selected, then its corresponding interface regions are rapidly computed.

At step 560, a check is made if a user has selected an existing and stored spatial boundary (e.g., the user taps or double taps or writes something within the spatial boundary). If so, then at step 520, the interface regions for the selected spatial boundary are automatically generated. Steps 520-540 are analogous to FIG. 10A in which the interface regions can be used to invoke particular computer functionality.

Figure 11:
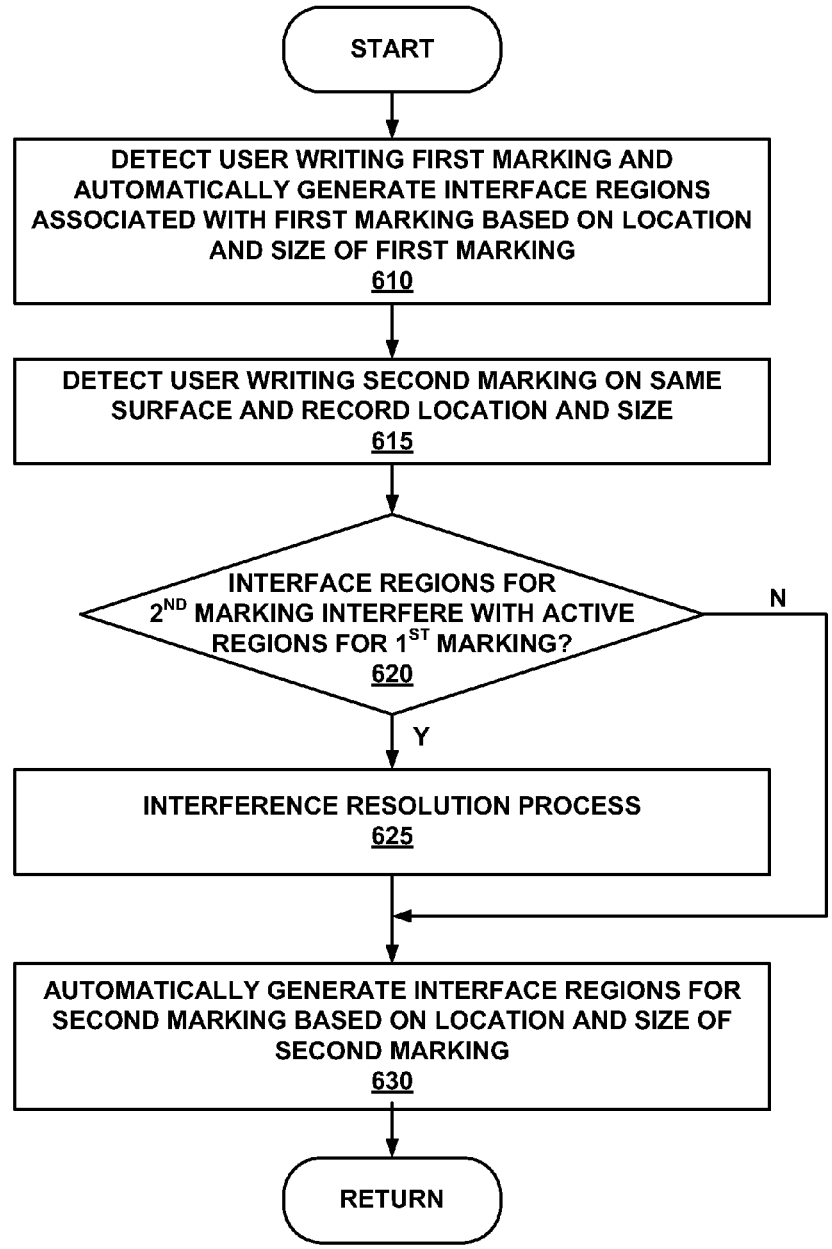
FIG. 11 is a flow diagram of a computer implemented process for resolving spatial interferences between interface regions in accordance with an embodiment of the present invention.

FIG. 11 illustrates a general procedure 600 used by embodiments of the present invention for detecting and resolving interface regions that spatially overlap on the written surface. Process 600 may be implemented on the interactive devices described with respect to FIG. 2 and FIG. 3. In one embodiment, process 600 may be implemented as computer code stored within memory units of the interactive device and executed on the processor thereof. At step 610, the interactive device detects a user writing a first marking and automatically generates interface regions associated with the first marking based on the size and location of the first marking. At step 615, the interactive device detects a user writing a second marking on the written surface and records the location and size of the second marking.

At step 620, the interactive device computes the location and size of the interactive regions associated with the second marking. Then, the device detects whether or not these interactive regions overlap with any other interactive regions, e.g., the interactive regions of the first marking. In one embodiment, overlap is detected by a comparison of the spatial coordinates of the interface regions. Upon a coordinate match, an overlap is detected. If no overlap is detected, then at step 630, the interactive device generates and activates the interface regions associated with the second marking.

However, at step 625, an overlap resolution process is entered to resolve the spatial ambiguity between the overlapping interface regions. One of several resolution processes may be performed, as described above. In one embodiment, at step 625, the interactive device may warn the user that the second marking is too close to the first marking. This is the warn model. In this embodiment, step 630 is not entered because the interface regions of the second marking are never created. The user is then encouraged to draw the second marking in a position does not overlap existing writings. In a second embodiment, the sharing model may be employed. In this case, at step 625 the interactive device determines if there is enough room between the first and second markings to share that space between the overlapping interactive regions. If so, then the widths (or heights, as the case may be) of the overlapping regions are shortened until the overlap is eliminated. Step 630 then creates the new interface regions for the second marking. If there is not enough space to allow sharing, then step 630 is not entered.

In a third embodiment, the time-out model, at step 625 the interactive device first checks if the marking associated with the first interface region has timed-out. In other words, if no user interaction has been done with the first marking, or any of its associated interface regions for a prescribed time-out period, then it is assumed that these objects are no longer active. If the first marking has timed-out, then step 630 is entered to generate the second interface regions. If the first marking is still active, then sharing may be attempted. If there is not enough space to allow sharing, then step 630 is not entered.

In a fourth embodiment, the pop-up model is used. In this model, overlapping interface regions are allowed as long as one of the regions is not currently active. Therefore, at step 625 it is determined whether or not the interface regions associated with the first marking are active. If not, then step 630 is entered. If these interface regions are active, then sharing may be attempted. If there is not enough space to allow sharing, then step 630 is not entered.

Figure 12:
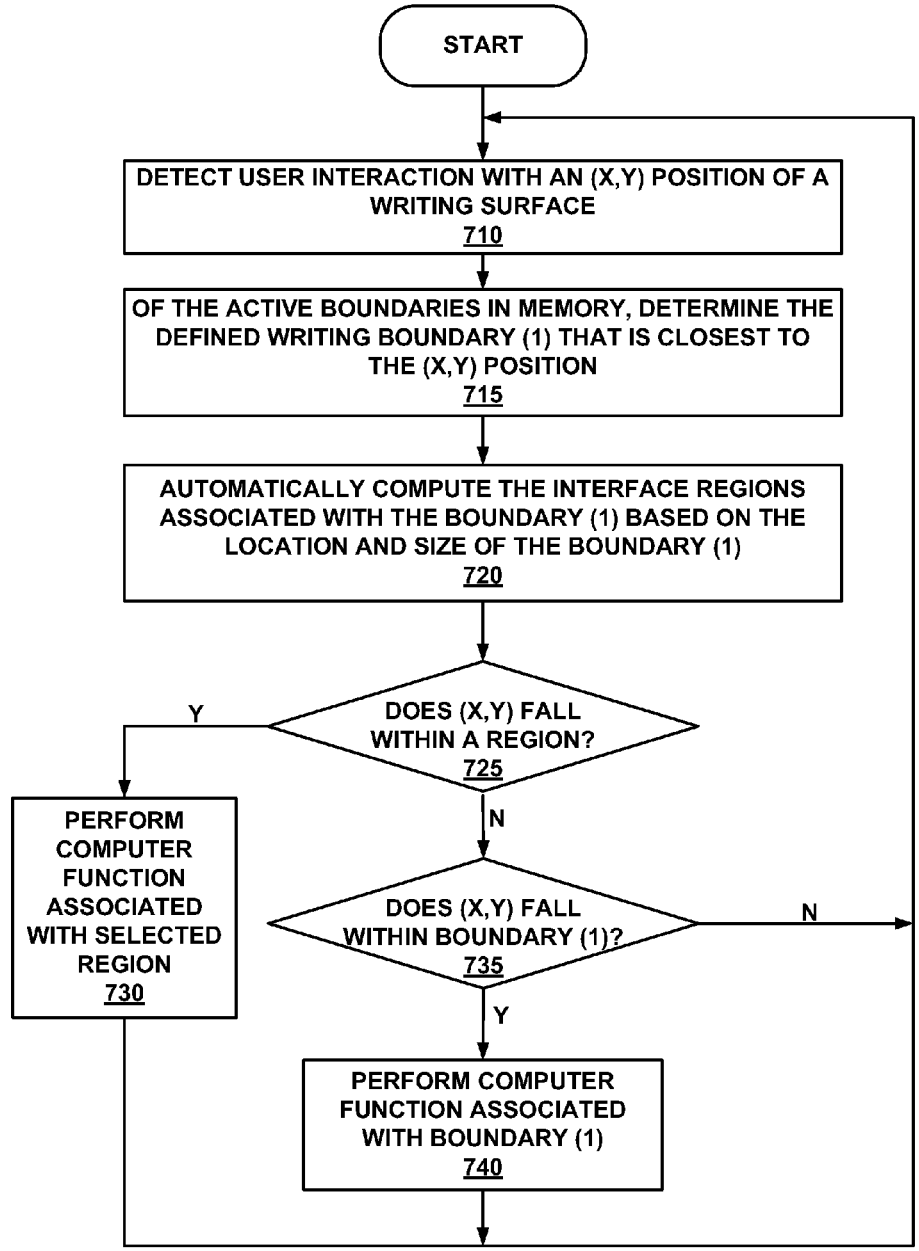
FIG. 12 is a flow diagram of a computer implemented process for computing the interface regions of a boundary "on-the-flow" after determining the closest boundary to a user action in accordance with an embodiment of the present invention.

FIG. 12 illustrates a procedure 700 which may be used by embodiments of the present invention for conserving computer resources in maintaining interface regions. In general, according to this embodiment, interface regions are not stored in memory persistently, but rather are computed and used when needed. Process 700 may be implemented on the interactive devices described with respect to FIG. 2 and FIG. 3. In one embodiment, process 700 may be implemented as computer code stored within memory units of the interactive device and executed on the processor thereof.

At step 710, the interactive device detects a user interacting with a coordinate (x,y) of the written surface, e.g., by a pen tap, double tap or writing thereon. The interactive device, at step 715, then scans its memory stored spatial boundaries (corresponding to written markings) to determine the spatial boundary that is closest to the (x,y) position. The interactive then, at step 720, computes the interface regions associated with the spatial boundary determined from step 715. At step 725, the interactive device then determines if the (x,y) coordinate falls within any of the interface regions computed at step 720. If so, then step 730 is entered which performs the computer function associated with the interface region of the (x,y) coordinate on the marking associated with the spatial boundary determined at step 715.

If the (x,y) position does not fall within an interface region, then from step 725, step 735 is entered. At step 735, the interface device checks if the (x,y) coordinate falls within the spatial boundary determined at step 715. If so, then the computer function associated with that spatial boundary is executed at step 740. The process then repeats.

The advantage of process 700 is that the interface regions do not need to be persistently stored in memory, but are computed as needed. The spatial boundaries associated with each marking are persistently stored. It is appreciated that this region interaction process 700 may be implemented as step 525 of FIGS. 10A and 10B in accordance with one embodiment.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A computer implemented method of interfacing with a user, said method comprising:
    identifying that a marking has been made by a writing device on a surface;
    identifying a location of said marking on said surface and identifying a size of said marking;

automatically computing a location and a size of a first interface region, wherein said first interface region is located adjacent to said marking;

associating a first computer function with said first interface region; and in response to a user selection of said first interface region, performing said first computer function on data associated with said marking.

2. The method as described in claim 1 further comprising:

automatically computing a location and a size of a second interface region of said surface wherein said second interface region is positioned adjacent to said marking and does not overlap said first interface region;

associating a second computer function with said second interface region; and in response to a user selection of said second interface region, performing said second computer function on said data.

3. The method as described in claim 2 wherein said first interface region is positioned spatially to the left of said marking and wherein further said second interface region is positioned spatially to the right of said marking.

4. The method as described in claim 2 wherein said first interface region is positioned spatially above said marking and wherein further said second interface region is positioned spatially under said marking.

5. The method as described in claim 1 wherein said user selection is performed by a user contacting a region of said surface located within said first interface region with a tip of said writing device.

6. The method as described in claim 1 wherein said location and said size of said first interface region are dependent on said location and said size of said marking.

7. The method as described in claim 6 wherein a height of said first interface region is dependent on a height of said marking.

8. The method as described in claim 7 wherein a width of said first interface region is dependent on said height of said marking.

9. The method as described in claim 7 wherein a width of said first interface region is fixed.

10. The method as described in claim 1 wherein said marking is a word and wherein said first interface region is invisible.

11. A computer implemented method of interfacing with a user, said method comprising:

identifying that a written marking has been selected by a user, wherein said written marking is located on a writing surface;

accessing from memory an interface region associated with said written marking;

automatically computing a location and a size of a first interface region, wherein said first interface region is located adjacent to said written marking;

associating a first computer function with said first interface region; and in response to a user selection of said first interface region, performing said first computer function on data associated with said written marking.

12. The method as described in claim 11 further comprising:

automatically computing a location and a size of a second interface region of said surface wherein said second interface region is positioned adjacent to said marking and does not overlap said first interface region;

associating a second computer function with said second interface region; and in response to a user selection of said second interface region, performing said second computer function on said data.

13. The method as described in claim 12 wherein said first interface region is positioned spatially to the left of said written marking and wherein further said second interface region is positioned spatially to the right of said written marking.

14. The method as described in claim 12 wherein said first interface region is positioned spatially above said marking and wherein further said second interface region is positioned spatially under said written marking.

15. The method as described in claim 11 wherein said user selection is performed by a user contacting a region of said surface located within said first interface region with a tip of said writing device.

16. The method as described in claim 11 wherein said location and said size of said first interface region are dependent on a location and size of said interface region of said written marking.

17. The method as described in claim 16 wherein a height of said first interface region is dependent on a height of said interface region of said written marking.

18. The method as described in claim 17 wherein a width of said first interface region is dependent on said height of said interface region of said written marking.

19. The method as described in claim 17 wherein a width of said first interface region is fixed.

20. The method as described in claim 11 wherein said written marking is a word and wherein said first interface region is invisible.

21. A computer implemented method of interfacing with a user, said method comprising:

identifying that a first marking has been made by a writing device on a surface;

identifying a location of said first marking on said surface and identifying a size of said first marking;

automatically computing respective locations and sizes of first plurality of interface regions that are each located adjacent to said first marking but do not overlap one another and wherein each interface region of said first plurality of interface regions is sized based on said size of said first marking;

associating a respective computer function with each interface region of said first plurality of interface regions; and in response to a user selection of a first interface region of said first plurality of interface regions, performing a first computer function on data associated with said first marking wherein said first computer function is associated with said first interface region of said first plurality of interface regions.

22. A method as described in claim 21 further comprising:

identifying that a second marking has been made by said writing device on said surface;

identifying a location of said second marking on said surface and identifying a size of said second marking;

automatically computing respective locations and sizes of a second plurality of interface regions that are each located adjacent to said second marking but do not overlap one another and wherein each interface region of said second plurality is sized based on said size of said second marking;

associating a respective computer function with each interface region of said second plurality of interface regions; and in response to a user selection of said first interface region of said second plurality of interface regions, performing said first computer function on data associated with said second marking wherein said first computer function is associated with said first interface region of said second plurality of interface regions.

23. A method as described in claim 22 wherein computer functions of said first plurality of interface regions are the same as computer functions of said second plurality of interface regions.

24. The method as described in claim 21 further comprising in response to a user selection of a second interface region of said first plurality of interface regions, performing a second computer function on data associated with said first marking wherein said second computer function is associated with said second interface region of said first plurality of interface regions.

25. The method as described in claim 21 wherein said first plurality of interface regions comprise said first interface region and a second interface region and wherein further said first interface region is positioned spatially to the left of said first marking and wherein said second interface region is positioned spatially to the right of said first marking.

26. The method as described in claim 21 wherein said first plurality of interface regions comprise said first interface region and a second interface region and wherein further said first interface region is positioned spatially above said first marking and wherein said second interface region is positioned spatially below said first marking.

27. The method as described in claim 21 wherein said user selection is performed by a user contacting a region of said surface located within said first interface region with said writing device.

28. The method as described in claim 21 wherein a height of each interface region of said first plurality of interface regions is based on a height of said first marking.

29. The method as described in claim 21 wherein said first marking is a word and wherein each interface region of said first plurality of interface regions is invisible.

30. An electronic device comprising:
a writing instrument;
a processor coupled to a bus;
a memory coupled to said bus; and
an optical detector coupled to said bus and disposed adjacent to said writing instrument, wherein said memory comprises instructions that when executed cause said processor to implement a method of interfacing with a user, said method comprising:
identifying that a marking has been made by a writing device on a surface;
identifying a location of said marking on said surface and identifying a size of said marking;
automatically computing a location and a size of a first interface region, wherein said first interface region is located adjacent to said marking;
associating a first computer function with said first interface region; and
in response to a user selection of said first interface region, performing said first computer function on data associated with said marking.

31. The electronic device as described in claim 30 wherein said method further comprises:
automatically computing a location and a size of a second interface region of said surface wherein said second interface region is positioned adjacent to said marking and does not overlap said first interface region;
associating a second computer function with said second interface region; and in response to a user selection of said second interface region, performing said second computer function on said data.

32. The electronic device as described in claim 31 wherein said first interface region is positioned spatially to the left of said marking and wherein further said second interface region is positioned spatially to the right of said marking.

33. The electronic device as described in claim 31 wherein said first interface region is positioned spatially above said marking and wherein further said second interface region is positioned spatially under said marking.

34. The electronic device as described in claim 30 wherein said user selection is performed by a user contacting a region of said surface located within said first interface region with a tip of said writing instrument.

35. The electronic device as described in claim 30 wherein said location and said size of said first interface region are dependent on said location and said size of said marking.

36. The electronic device as described in claim 35 wherein a height of said first interface region is dependent on a height of said marking.

37. The electronic device as described in claim 36 wherein a width of said first interface region is dependent on said height of said marking.

38. The electronic device as described in claim 30 wherein said marking is a word and wherein said first interface region is invisible.

* * * * *